United States Patent Office 3,472,868
Patented Oct. 14, 1969

3,472,868
1-(2-5-DIOXO-PYRROLIDINO-4-(PERHYDRO-AZEPINO)-BUTYNE-2
Esther Ber, Paris, Pierre F. G. Nau, Argenteuil, and Frajda Dvolaitzky, Paris, France, assignors to Laboratoires Auclair, Montrouge, France, a corporation of France
No Drawing. Filed Dec. 26, 1967, Ser. No. 693,136
Int. Cl. C07d 41/08; A61k 27/00
U.S. Cl. 260—326.3   6 Claims

ABSTRACT OF THE DISCLOSURE

The new chemical compound (dioxo-2,5-pyrrolidino-1)-1 (perhydroazepino-1)-4 butyne-2, salts thereof with pharmaceutically acceptable acids, and processes for the preparation of these compounds. They are active on the central nervous system and possess central anti-cholinergic properties, when render them of value in the treatment of Parkinson's disease and of other neurological and mental diseases.

---

The invention relates to a new chemical compound, a derivative of 2-butyne, and to the preparation of said compound from available starting materials.

The invention is particularly concerned with a new chemical compound, the compound (dioxo-2,5-pyrrolidino-1)-1 (perhydroazepino-1)-4 butyne-2, which in a somewhat different form of nomenclature can also be named as 1-[4-(1-hexahydroazepinyl)-2-butynyl]-,5-pyrrolidine dione.

This new chemical compound is valuable for use in medicine, being active on the central nervous system and possessing central anti-cholinergic properties. These properties render it of value in the treatment of Parkinson's disease, as well as for the treatment of other neurological and mental diseases.

The new chemical compound, a new derivative of 2-butyne, herein referred to as (dioxo-2,5-pyrrolidino-1)-1 (perhydroazepino-1)-4 butyne-2, has the formula

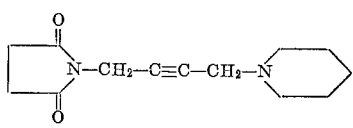

(I)

When utilized as the active substance in a medicament it may be used in the form of its free base, or in the form of a salt thereof prepared by reaction of the base with a pharmaceutically acceptable acid.

In the preparation of the new chemical compound with which this invention is concerned, (dioxo-2,5-pyrrolidino-1-)-1 (perhydroazepino-1)-4 butyne-2, N-propargyl-succinimide represented by the formula

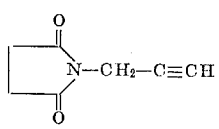

(II)

is condensed with hexamethylene imine or perhydroazepine (hexahydroazepine). Advantageously this condensation is carried out in the presence of a copper compound as catalyst.

The presence of the catalyst is indeed most desirable in order to obtain improved yields as desirable in industrial production. As such copper compounds the following salts, or cuprous and cupric oxides, may be used: cupric acetate, basic acetate, bromide, chloride, ammonium chloride formate, nitrate, oxide, sulfate, and the p.-toluenesulfonate, as well as cuprous acetate, bromide, cyanide, iodide, oxide and thiocyanate. The quantity of copper may vary within wide limits of 0.1 to 10 percent of the weight of the propargylsuccinimide used, an amount of from about 2 to 4 percent being generally satisfactory. The foregoing list of cuprous and cupric compounds effective as catalysts is to be regarded as illustrative rather than limitative.

Formaldehyde may be used as aqueous solution of formol, generally in 30 percent solution; or gaseous formol, or alternatively trioxymethylene or paraformaldehyde, may be utilized.

The conditions of pH, solvent, concentration and temperature do not greatly affect the result of the reaction. Thus, one may use as solvent: water, dioxan, or any other appropriate solvent, as long as it does not react with the reagents present.

The reaction may be carried out in neutral medium; or in slightly alkaline medium; or in slightly acidified medium, as for example acetic acid.

The condensation product (I) is subsequently extracted as for example with chloroform, then purified by distillation under high vacuum. It appears as an oil which crystallizes upon cooling. The solid product may be purified again by crystallization in an appropriate solvent, such as cyclohexane, hexane, petroleum ether, ethyl acetate, etc. Thus, white crystals are obtained, which are water soluble, mainly in acid medium, and in organic solvents; melting point 37-38° C.

The base (I) combines with mineral and organic acids to give crystalline salts which are very soluble in water. They may be used as active substance for medical uses, equivalent to the base itself, provided the salts are those of pharmaceutically acceptable acids. The salts most easily obtained in the crystalline state are derived from organic divalent acids such as oxalic, malonic, succinic, glutaric, adipic, maleic, fumaric, tartaric, itaconic, citraconic acids, etc., or from organic tribasic acids such as citric acid, etc.

If one designates by A the anion of an organic divalent acid, and by B the derivative (I), then the salts obtained correspond to the formula AB.

N-propargyl-succinimide, used as starting material for the preparation of the derivative (I), may itself be prepared by the reaction of a propargylic ester (for example the bromide, chloride, or para-toluene sulfonate) with succinimide in the presence of anhydrous potassium carbonate.

The substituted imide is separated from the mineral salts by extraction with toluene. It is subsequently purified by distillation. Thus, the crystalline product is obtained in excellent yield (88 percent). This simple and rapid process is in conformity with the requirements of industrial production.

The following examples illustrate the preparation of the derivative (I) and of various salts thereof.

EXAMPLE 1

N-propargyl-succinimide (dioxo-2,5 pyrrolidino-1)-3-propyne-1

In a mortar, 100 grams of succinimide and 83 grams of dipotassium carbonate, which had previously been dried overnight in the dryer at 100° C. are mixed thoroughly. This mixture is then placed in a round flask of 1 liter capacity fitted with a reflux condenser and an ampoule for bromine. 180 grams of propargyl bromide are added dropwise, slight heat is applied in the beginning to start the reaction. The addition of propargyl bromide is regulated so as to maintain slight reflux. If the reaction should become violent, it is cooled in an ice bath. Subsequently it is heated on reflux overnight, and the reaction medium is extracted by several portions of boiling toluene. The toluene extract is dried over sodium sulfate.

Following distillation under vacuum, there are obtained: 122 grams of N-propargyl-succinimide; boiling point 110° C./0.05 mm. Mercury pressure; (Yield=88 percent). The product is recovered as a colorless oil, which solidifies upon cooling to give a solid of melting point 49–51° C. It may be used in this condition for the reactions described in the examples which follow.

By crystallization in absolute alcohol or distilled water, pure N-propargyl-succinimide is obtained. The product is secured in the form of white flakes, melting at 52–53° C.

*Analysis.*—$C_7H_7NO_2$=137.1. Calc. percent: C, 61.30; H, 5.15; N, 10.22. Found percent: C, 61.37; H, 5.11; N, 10.25.

EXAMPLE 2

(Dioxo-2,5 pyrrolidino-1)-1 (perhydroazepino-1)-4 butyne-2

This compound may be prepared according to either of the procedures (a) or (b) as described below.

(a) A mixture of 13.7 grams N-propargyl-succinimide, 10 grams of hexamethylene-imine, 11 grams of 30 percent aqueous formol, 6 grams of glacial acetic acid, 300 milligrams of cuprous chloride, and 6 cc. of water is heated for 4 hours at a temperature of 50° C. with mechanical stirring and in an atmosphere of nitrogen.

The reaction mixture is left to stand overnight under nitrogen, and then poured onto about 20 grams of ice combined with 50 cc. chloroform. The mixture is made alkaline with 20 percent sodium hydroxide solution, and the aqueous phase is extracted with several portions of chloroform.

The chloroform extract is dried over anhydrous sodium sulfate, and subsequently distilled. There is thus secured 15.4 grams (yield=62 percent) of (dioxo-2,5-pyrrolidino-1)-1 (perhydroazepino-1)-4 butyne-2; boiling point 172–173° at 0.3 millimeter of mercury pressure. The product solidifies after being kept in the refrigerator.

After recrystallization in an ethyl-acetate/petroleum ether mixture, or in pure cyclohexane, the product is secured in the form of fine white needles soluble in water and in organic solvents; it melts at 37–38° C.

*Analysis.*—(1) Acidimetry in non-aqueous medium (0.1 N perchloric acid in acetic acid, indicator: methyl violet): Mol. wt.—Calculated for $C_{14}H_{20}N_2O_2$: 248.3. Found: 250.4. (2) Acidimetry in aqueous medium—Dissolving a test sample in 0.1 N excess hydrochloric acid, and back-titration in the pH meter with 0.1 N sodium hydroxide: Mol. wt.—Calculated for $C_{14}H_{20}N_2O_2$: 248.3. Found: 251. pK=7.9.

(b) A mixture of 13.7 grams N-propargyl succinimide, 3.3 grams of trioxymethylene, 11 grams of hexamethylene imine, 500 milligrams cupric acetate and 100 cc. of pure dioxan is heated for 5 hours at 70° C. with mechanical stirring and in a nitrogen atmosphere. This mixture is left overnight at room temperature under nitrogen.

Dioxan is removed by vacuum distillation, and the residue is extracted with chloroform. The chloroform extract is washed with ammonia to remove the copper, then dried over anhydrous sodium sulfate. After distillation, 19.4 grams (yield=78 percent) of (dioxo-2,5-pyrrolidino-1)-1 (perhydroazepino-1)-4 butyne-2 is obtained. Boiling point 170–171° C. under 0.3 millimeter of mercury pressure.

After recrystalliaztion from ethyl acetate/petroleum ether mixture, the product secured melts at 37–38° C. It is identical with the product prepared in paragraph (a).

EXAMPLE 3

Fumarate of (dioxo-2,5-pyrrolidino-1)-1 (perhydroazepino-1)-4 butyne-2

Equimolecular quantities of base and fumaric acid are dissolved in boiling absolute alcohol. The mixture is left to stand overnight in the refrigerator, and the crystals of fumarate are separated. The product is then recrystallized in absolute ethyl alcohol. The fumarate of (dioxo-2,5-pyrrolidino-1)-1 perhydroazepino-1)-4 butyne-2 is secured in the form of fine white crystals, very readily soluble in water. It melts at 94–96° C. in a capillary tube, or at 106–107° C. on a heater plate.

*Analysis.*—(1) Acidimetry in non-aqueous medium: Mol. wt.—Calculated for $C_{18}H_{24}N_2O_6$: 364.4. Found: 366.1. (2) Acidimetry in aqueous medium: Mol. wt.—Calculated for $C_{18}H_{24}N_2O_6$: 364.4. Found: 365.5.

EXAMPLE 4

Oxalate of (dioxo-2,5-pyrrolidino-1)-1 (perhydroazepino-1)-4 butyne-2

12.4 grams of base and 6.3 grams of oxalic acid dihydrate are dissolved in 30 cc. of absolute ethanol with heating and left overnight in the refrigerator. The precipitate is separated and recrystallized in a minimum amount of absolute ethanol. There are thereby obtained 12 grams of fine white crystals which are very readily soluble in water, melting point 148° C.

*Analysis.*—(1) Acidimetry in non-aqueous medium: Mol. wt.—calculated for $C_{16}H_{22}N_2O_6$: 338.3. Found: 340.5. (2) Acidimetry in aqueous medium: Mol. wt.—calculated for $C_{16}H_{22}N_2O_6$: 338.3. Found: 342.2.

EXAMPLE 5

Hydrochloride of (dioxo-2,5-pyrrolidino-1)-1 (perhydroazepino-1)-4 butyne-2

A stream of dry hydrogen chloride gas is led through an ethereal solution of the base, cooled in an ice bath.

The hydrochloride is separated, washed with anhydrous ethyl ether and crystallized in an ethyl acetate/petroleum ether mixture. The product is obtained as fine white crystals, melting at 183–185° C. on a heating plate, and at 181° C. in a capillary tube (not corrected).

*Analysis.*—$C_{14}H_{21}ClN_2O_2$—284.8. Cl calculated, 12.47 percent. Found, 12.44 percent.

EXAMPLE 6

Picrolonate of (dioxo-2,5-pyrrolidino-1)-1 (perhydroazepino-1)-4 butyne-2

To 5 grams of base dissolved in a few cc. of absolute ethanol, a hot saturated solution of 5.3 grams of picrolonic acid in absolute ethanol are added.

The crystals are separated after cooling and recrystallized from absolute ethanol. There are thereby obtained fine yellow needles of the title compound. Melting point 214–215° C.

*Analysis.*—Acidimetry in non-aqueous medium: Mol. wt.—calculated for $C_{24}H_{28}N_6O_7$: 512.5. Found: 514.7.

The central anti-cholineric activity of (dioxo-2,5-pyrrolidino-1)-1 (perhydroazepino-1)-4 butyne-2 is demonstrated by its antagonistic action exhibited towards the various effects of oxotremorine, evident at the level of the central nervous system. Oxotremorine is the compound 1-(2-oxo 1-pyrrolidino) 4-(1-pyrrolidino)-but-2-yne.

Thus, when administered as a base or in the form of its salts, in doses varying from 3–10 mg./kg. (expressed as the base), either parenterally, or per os, it suppresses or prevents completely or partially the tremor induced in the mouse by an oxotremorine salt (picrolonate or fumarate: 1 mg./kg.) without changing the peripheral cholinergic phenomena, such as diarrhea, excessive salivation, and lachrymation.

Administered in a dose of 10 mg./kg., it suppresses analgesia induced by oxotremorine fumarate (100 to 200 µg./kg.); likewise, when administered parenterally in a dose corresponding to 40 mg. of base/kg. It greatly inhibits hypothermia induced by oxotremorine fumarate in a dose of 1 mg./kg., since after 20 minutes hypothermia is only 2.3° C. in treated animals, as compared to 8.5° C. in the controls.

In addition to the antagonism towards the central effects of oxotremorine, other central effects of this product were seen. Thus, when administered in dosages of 10 mg./kg. and 20 mg./kg., it prevents appearance of the cataleptic syndrome induced by haloperidol in a dose of 3 mg./kg. in the mouse and the rat.

When administered in a dose of 10 mg./kg. five minutes prior to the test, it sensitizes the mouse to electroshock, provoking a mortality rate of 80 to 100 percent at a voltage lower than that which results in electro-shock in the controls.

Regarding its action towards hypnotics, when administered in a dose of 20 mg./kg. at the same time as the barbiturates (hexobarbital 75 mg./kg.) or chloral (325 mg./kg.), the product of the invention causes a slight increase in the time of experimental sleep, without producing the phenomenon of second sleep.

The peripheral effects of the product towards the cholinergic effects of oxotremorine were studied in the mouse in vivo. Likewise the effects of the product were studied on the arterial pressure in the rat, the isolated intestine of rodents, the diaphrgam-phrenic nerve of the rat, the rectus abdominis in the frog, etc.

In general, the peripheral anti-cholinergic properties of (dioxo-2,5-pyrrolidino-1)-1 (perhydroazepino - 1) - 4 butyne-2 are evident in the mouse in vivo at greater doses than the central anti-cholinergic properties. Thus, the dose of 3 mg./kg. of (dioxo-2,5-pyrrolidino-1)-1 (perhydroazepino-1)-4 butyne-2 protects 70 percent of the animals against tremor induced by 1 mg./kg. of a salt of oxotremorine, while, however, it is necessary to administer 40 mg. per kg. of the product to obtain the same percentage of protection against the peripheral cholinergic symptom provoked by the identical dose of oxotremorine.

With regard to arterial pressure, this product when administered up to a dose of 1 mg./kg. intravenously, does not give evidence of direct action. Between 2 and 10 mg./kg. intravenously, it presents slight hypotensive action, this action not being suppressed by atropine. With regard to anti-cholinergic action, it is necessary to administer 5 to 10 mg./kg. of (dioxo-2,5-pyrrolidino-1)-1 (perhydroazepino-1)-4 butyne-2 to achieve about 50 percent reduction in hypotension determined by 1 $\mu$g./kg. oxotremorine, or hypotension induced by 0.5 $\mu$g./kg. of chloride of acetylcholine.

On the isolated duodenum of the rat, the compound (dioxo-2,5-pyrrolidino-1) - 1 (perhydroazepino - 1) - 4 butyne-2, administered in a concentration of 1 to $2.10^{-6}$, does not exert any action of its own, but it diminishes the spasmogenic action of oxotremorine (concentration $2.10^{-8}$).

On the guinea pig ileum, this product administered in concentrations of from 2 to $10.10^{-6}$ does not change the spasmogenic action of histamine.

In contrast to the same derivative of 2-butyne substituted, however, in 1-position by the α-pyrrolidone group instead of the dioxo-2,5-pyrrolidine group, the (dioxo-2,5-pyrrolidino-1)-1 (perhydroazepino-1) - 4 butyne-2 does not exert any curarising action on the diaphragm-phrenic nerve specimen of the rat. When administered up to a concentration of $2.10^{-4}$, it does not modify the contractions of the electrically stimulated diaphragm.

Administered in a dose of 50 mg./kg. intravenously in vivo to the rat, it does not exert any curarising action on the anterior muscle of the leg (M. tibialis anterior).

The compound (dioxo-2,5-pyrrolidino-1)-1 (perhydroazepino)-4 butyne-2 possesses very slight toxicity, the $LD_{50}$ in the mouse being 233.5 mg./kg. in intraperitoneal administration, and 662.7 mg./kg. upon oral administration. In the rat in intraperitoneal administration is 196.5 mg./kg. and it is about 2 g./kg. upon oral administration.

Therefore the margin between effective doses and toxic doses of the product is very wide, and offers a very favorable therapeutic index.

From its pharmacological properties derive the major indications for use of the medicament according to the invention, i.e. treatment of troubles of the central nervous system, and particularly Parkinson's syndrome of various etiology. According to these indications, the medicament may be administered orally or parenterally, the active substance being combined with conventional carriers and excipients suitable for these modes of administration. Thus, pharmaceutical formulations suitable for this medicament are tablets, coated pills, gelatin capsules, ampoules with drinkable and ampoules with injectable content. In this formulation the quantity of active substance (expressed as the base) per unit of dosage may vary from 2 to 10 mg., and it may be administered once or several times per day.

Herebelow, to illustrate this invention, we shall give some examples of formulation and their methods of preparation.

(A) Tablets of fumarate of (dioxo-2,5-pyrrolidino-1)-1 (perhydroazepino-1)-4 butyne-2, in doses of 4 mg. of active base.

| | Grams |
|---|---|
| Fumarate of (dioxo-2,5-pyrrolidino-1)-1 perhydroazepino-1)-4 butyne-2 | 587 |
| Lactose | 7,000 |
| Wheat starch | 6,913 |
| Potato starch | 400 |
| Magnesium stearate | 100 |
| For 100,000 tablets of 150 mg. | 15,000 |

The fumarate, lactose and wheat starch are thoroughly mixed, the potato starch in the form of 10 percent starch paste; the moist mass is granulated on a sieve and dried at 45° C. Magnesium stearate is added to the granulate, and compressed to 150 mg. weight, either on an ex center machine or on a rotatory machine.

(B) Coated tablets of fumarate of (dioxo-2,5-pyrrolidino-1)-1 (perhydroazepino-1)-4 butyne-2 in doses of 2 mg. of active substance.

Procedure as described above, but using 294 grams of fumarate instead of 587 grams, and 7,293 grams of lactose instead of 7,000 grams.

The compressed tablets obtained in this manner are placed in a coating drum, and they are given a shiny polish by lacquer gum or any other suitable glazing agent. The glaze-coated tablets are dried, and coated by successive additions of sugar syrup.

The finishing is completed, after the desired final weight is obtained, by addition of sugar syrup containing a pharmaceutically acceptable coloring agent.

The coated tablets are polished with a mixture of white wax and paraffin dissolved in petroleum ether.

(C) Gelatin capsules of fumarate of (dioxo-2,5-pyrrolidino-1)-1 (perhydroazepino-1)-4 butyne-2 in doses of 2 mg. of active base:

| | Grams |
|---|---|
| Fumarate of (dioxo-2,5-pyrrolidino-1)-1 (perhydroazepino-1)-4 butyne-2 | 294 |
| Lactose | 19,506 |
| Magnesium stearate | 200 |
| For 100,000 gelatin capsules containing 200 mg. of powder | 20,000 |

These are mixed together thoroughly and divided into gelatin capsules of appropriate size.

(D) Ampoules of fumarate of (dioxo-2,5-pyrrolidino-1)-1 (perhydroazepino-1)-4 butyne-2 in doses of 5 mg. of active substance:

| | Grams |
|---|---|
| Fumarate of (dioxo-2,5-pyrrolidino-1)-1 (perhydroazepino-1)-4 butyne-2 | 73.4 |
| p. Methylhydroxybenzoate | 10 |
| p. Propylhydroxybenzoate | 2 |
| Sweetened aromatized excipient to make 50,000 ml. | |
| for 10,000 ampoules of 5 ml. | |

Dissolve while hot and fill into ampoules of 5 ml. These are taken orally by the patient.

(E) Injectable ampoules of hydrochloride of (dioxo-2,5-pyrrolidino-1)-1 (perhydroazepino-1)-4 butyne-2 in doses of 10 mg. of active substance:

Tydrochloride of (dioxo-2,5-pyrrolidino-1)-1
  (perhydroazepino-1)-4 butyne-2 _____grams___ 114.5
Sodium hydroxide quantity sufficient for pH 7.3.
Isotonic solution of sodium chloride enough to
  make _____ml__ 20,000

This is sufficient for 10,000 ampoules of 2 ml. each.

Dissolve while hot, adjust to pH 7.3 by addition of sodium hydroxide, divide and fill into ampoules of 2 ml. each. These are sterilized, either by aseptic filtration, or by autoclaving.

The activity of the medicament in accordance with our invention was substantiated by clinical testing.

Clinical trials were carried out chiefly on twelve patients suffering from extrapyramidal symptoms. Seven of these patients were afflicted with Parkinson's syndrome of various etiology (idiopathic, post-encephalitic, or vascular); the five other patients exhibited extrapyramidal symptoms due to administration of neuroleptic drugs of the phenothiazine series, and butyrophenones. The patients were examined, and each primary symptom was evaluated by a score of 0–3, according to the intensity of the corresponding symptom: trembling, muscular rigidity, akinesia, speech trouble, lingual dyskinesia, muscular cramps, excessive salivation, sebaceous hypercrinia, constipation, oculogyric disturbances. Study of possible secondary reactions included study of changes in blood pressure, changes in the blood composition, hepatic tests (cholesterol, clotting tests, transaminases), and renal tests (blood urea, tests of urea clearance and phenolsulfonphthalein tests).

The doses administered were increased only very progressively, starting with doses approximately ten times lower than those active in animals (keeping in mind the weight ratio between the test animal and the patient) in order to reach those doses which produce therapeutic effects, or undesirable side effects. Dosage of the medicament, expressed as the base, is from 4 to 24 mg. per day.

Side effects were seen in one single case of sensation of gastric burn and nausea. An effect of the product per se cannot be formally eliminated, but it appears more likely that these troubles, occurring at the start of treatment, may be related to a too rapid substitution of (dioxo-2,5-pyrrolidino-1)-1 (perhydroazepino-1)-4 butyne-2, for the previous treatment using orphenadrine and trihexyphenidyl. To date, no phenomenon of the chlolinergic type was evident, for example sweating, excessive salivation, increase in intestinal peristalsis or diarrhea. No case of significant drop in blood pressure was detected. For this reason it has not been found necessary in any of our cases to supplement treatment by atropine or a peripheral anti-cholinergic agent.

Therapeutic results were very satisfactory.

At first, reduction of muscular rigidity, then of trembling, were observed. On the whole the results were quite clearly better than those obtained by classic anti-Parkinson medication which the patients had been given until that time. That medication had been progressively replaced by (dioxo-2,5-pyrrolidino-1)-1 (perhydroazepino-1)-4 butyne 2.

Where extrapyramidal syndromes appeared as side effects after administration of neuroleptic drugs, (dioxo-2,5 - pyrrolidino - 1) - 1 (perhydroazepino - 1) - 4 butyne-2 has given excellent results in doses of from 2 to 12 mg. in four cases out of five. In one single case, wherein schizophenia was treated with thioproperazine and butyrophenone, the extrapyramidal syndrome had regressed only to a very slight extent after a period of ten days. Simultaneous administration of trihexyphenidyl from that date onwards had not given any appreciable results after fifteen days of treatment.

The following clinical case reports are presented as illustrative:

Case Number 1.—Man, age 68 had been treated for about ten years for Parkinson's disease, which had appeared within a few months about the age of 55. The disease had evolved rapidly. Despite anti-Parkinson treatment (trihexyphenidyl 15 mg. and orphenadrine 150 mg.) a rigidity of degree 2 was present, tremor of degree 3 and persistent excessive salivation. The patient was given (dioxo - 2,5 - pyrrolidino - 1) - 1 (perhydroazepino - 1)-4 butyne - 2 in progressive doses, starting with 4 mg. and increasing to 12 mg. per 24 hours. Muscular rigidity diminished in a few days to stage 1, as well as the tremor and speech trouble. Excessive salivation has remained sizeable, but more inconstant. No secondary or side effects. Arterial blood pressure remained unchanged at 15½–9.

Case Number 2.—Man, age 46, whose post-encephalitic Parkinson's syndrome had started at age 26. Before treatment: spontaneous motility of degree 1, akinesia of degree 2, tremor of degree 3. Treatment with (dioxo-2,5-pyrrolidino-1)-1 (perhydroazepino-1)-4 butyne-2 at doses progressively attaining 12 mg. per day, caused total disappearance of muscular rigidity and cramps, reduced tremor to stage 1, without any secondary effect. Arterial blood pressure unchanged at 13–8.

Case Number 3.—Male, age 63. Parkinson's syndrome of vascular origin, evolving for about 4 years. Spontaneous motility 1, akinesia in degree 2, rigidity and tremor of degree 2. Speech trouble, considerable excessive salivation, constipation and sebaceous hypercriia. Treatment with trihexyphenidyl and orphenadrin had brought about only extremely limited abatement of the troubles. With (dioxo - 2,5 - pyrrolidino - 1) - 1 (perhydroazepino - 1)-4 butyne-2 in doses of 12 mg. per day, akinesia and muscular rigidity disappeared completely. Tremor diminished to stage 1. Excessive salivation had clearly abated, but constipation and sebaceous hypercrinia remained unchanged. No undesirable side effects. Arterial blood pressure at 16–10 without change.

Case Number 4.—Man, age 34, treated for schizophrenia with delirium, necessitating several admissions to a psychiatric hospital. Treatment with thioproperazin and butyrophenone had remarkable effect on the schizophrenic syndrome, but it caused very pronounced disturbances with Parkinsonian symptoms: akinesia, muscular rigidity, slight tremor, almost complete abolition of facial movement. These difficulties were only slightly improved by treatment with atrophine derivatives and trihexyphenidyl. However, within three days, (dioxo-2,5-pyrrolidino-1)-1 (perhydroazepino-1)-4 butyne-2 caused complete regression of the Parkinson syndrome at a dose of 8 mgs., later of 12 mgs. per day, without evidence of incompatibility, and without change in the patient's blood pressure.

Case Number 5.—Man, age 28, was treated with thioproperazine for an attack of schizophrenia (the second) which had appeared within a few days of the first attack. The treatment resulted in great improvement but it did not bring about disappearance of delirium, which the patient started to complain about. A certain degree of autism persisted. Toward the twenty-fifth day an extrapyramidal syndrome set in, including akinesia, muscular rigidity and fixed aspect of the face and the entire body. Anti-Parkinson drugs of synthetic origin caused only incomplete regression of this clinical picture. Then (dioxo-2,5 - pyrrolidino - 1) - 1 (perhydroazepino - 1)-4 butyne-2 was prescribed, first at a dosage of 12 mg. daily, subsequently at a dosage of 20 mgs. per day. In less than one week the extrapyramidal troubles regressed considerably, without causing any change in the effects resulting from the phenothiazine therapy. No undesirable side effects were observed. Arterial blood pressure, which had been 11½–8 prior to treatment with thioproperazine, had decreased during treatment to 11½–6. It rose again to 12½–7 during treatment with (dioxo-2,5-pyrrolidino-1)-1-(perhydroazepino-1)-4 butyne-2.

We claim:
1. A compound selected from those of the formula

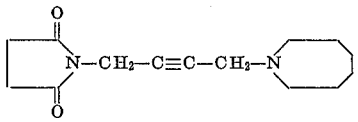

and salts thereof with pharmaceutically acceptable acids.
2. 1 - (2,5 - dioxo - pyrrolidino) - 4 - (perhydroazepino)-butyne-2, as claimed in claim 1.
3. The fumarate salt of 1-(2,5-dioxo-pyrrolidino)-4-(perhydroazepino)-butyne-2, as claimed in claim 1.
4. The oxalate salt of 1-(2,5-dioxo-pyrrolidino)-4-(perhydroazepino)-butyne-2, as claimed in claim 1.
5. The hydrochloride salt of 1-(2,5-dioxo-pyrrolidino)-4-(perhydroazepino)-butyne-2, as claimed in claim 1.
6. The picrolonate salt of 1-(2,5-dioxo-pyrrolidino)-4-(perhydroazepino)-butyne-2, as claimed in claim 1.

References Cited
UNITED STATES PATENTS
3,354,178   11/1967   Dickinson _____ 260—326.3

NICHOLAS S. RIZZO, Primary Examiner
JOSE TOVAR, Primary Examiner

U.S. Cl. X.R.
260—326.5; 424—274

PO-1050
(5/69)

UNITED STATES PATENT OFFICE
CERTIFICATE OF CORRECTION

Patent No. 3,472,868                     Dated  October 14, 1969

Inventor(s) Esther Ber; Pierre F.G. Nau; and Frajda Dvolaitzky

It is certified that error appears in the above-identified patent and that said Letters Patent are hereby corrected as shown below:

Formula (I), Column 1, lines 41 to 46, reading:

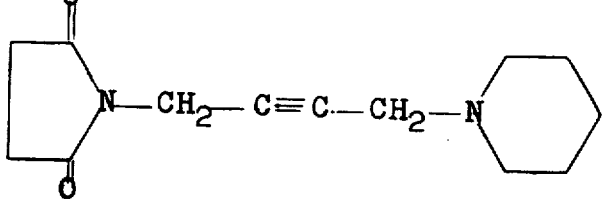

should read:

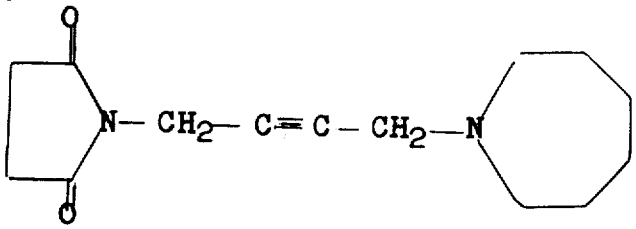

SIGNED AND
SEALED
FEB 24 1970

(SEAL)
Attest:

Edward M. Fletcher, Jr.
Attesting Officer

WILLIAM E. SCHUYLER, JR.
Commissioner of Patents